Patented Nov. 5, 1935

2,020,066

UNITED STATES PATENT OFFICE 2,020,066

MANUFACTURE OF LOW POUR LUBRICATING OIL

Merrill Kiser, Lawrenceville, Ill., assignor to Indian Refining Company, Lawrenceville, Ill., a corporation of Maine No Drawing. Application May 16, 1932, Serial No. 611,639

5 Claims. (Cl. 196—19)

This invention relates to a dewaxing process for the removal of paraffin or solid hydrocarbons from wax-bearing mineral oil for the production of lubricating oil having a low pour test.

The invention contemplates the process of manufacturing lubricating oil of low pour test by a dewaxing process comprising mixing with a wax-bearing mineral oil a diluent liquid, or a solvent liquid having selective solvent action between solid and liquid hydrocarbons at temperatures of around 0° F., and containing a liquid which is precipitated in crystalline form to serve as a filter-aid material at the dewaxing temperature. The mixture is then cooled to a temperature of around 0° F. or below in order to precipitate the wax constituents of the oil as solid hydrocarbons in admixture with the crystalline filter-aid material, thereby forming a readily separable and filterable precipitate. The mixture, while maintained in a chilled condition, is subjected to filtering or settling to separate the resulting precipitate from the liquid hydrocarbons.

My invention contemplates the use of a filter-aid material which is in liquid form at ordinary temperatures, preferably of comparatively low boiling point, for example, not in excess of about 300° F., and which may be precipitated in crystalline form upon cooling, the resulting crystals having a melting point substantially below that of the wax separated from the wax-bearing oils.

More specifically, the invention contemplates mixing with the diluent or solvent liquid a liquid material of the type such as benzol in such proportion that, upon cooling to 0° F. or below, a substantial portion of the benzol is precipitated in crystalline form. When a solution of wax-bearing oil and solvent containing excess benzol is cooled to 0° F., or a temperature at which wax constituents are precipitated from the mixture, the resulting precipitate will then comprise solid hydrocarbons in admixture with benzol crystals, and which is, therefore, in a readily filterable form.

The filter-aid material of my invention is adapted for use in connection with various dewaxing solvents, such as naphtha, light petroleum fractions, aliphatic ketones or mixtures of these materials with the homologs of benzene and the like. The invention is, therefore, particularly well adapted for use in conjunction with a dewaxing operation, such as that described in U. S. Patent No. 1,802,942, issued to Francis X. Govers, wherein the waxes are separated from the oil by means of a selective solvent liquid.

Thus, according to the process of my invention, where it is contemplated dewaxing with a mixture of acetone and benzol, the proportion of benzol in the mixture is increased sufficiently so that, upon chilling to the dewaxing temperature, the excess benzol is precipitated in crystalline form to act as the filter-aid medium while the remainder of the benzol remains in liquid form to impart the essential selective properties to the solvent liquid mixture in order to effect the necessary separation between solid and liquid hydrocarbons.

Another suitable solvent mixture may comprise acetone, benzol and toluol, particularly where it is desired to carry out the dewaxing operation at relatively low temperatures for the production of lubricating oils quite low in pour test, as for example, around —20° to —40° F. In such a mixture, the benzol component may be utilized merely to supply the crystalline filter-aid material upon cooling to the dewaxing temperature.

Certain organic substances or liquid materials have been proposed in the prior art for the purpose of facilitating the removal of wax from hydrocarbon oils; for example, such substances as diphenyl, naphthalene, anthracene, p-dichlorbenzene, etc. These materials have melting points of 127° F. and higher, and which are, therefore, within the melting point range of the various wax constituents of wax-bearing distillates of the cylinder stock type. Thus, the wax constituents of such distillates may range in melting point from around 100° F. to 160° F. Consequently, these filter-aid materials are not readily and completely separated from the wax or petrolatum by warming or steaming. On the other hand, their boiling points are well in excess of 300° F. and they are, therefore, not very readily separated by ordinary steam distillation. Benzol crystals, on the other hand, have a melting point of around 40° F. which is substantially well below the melting point of the wax constituents usually found in this type of distillate. Benzol also boils at 176° F. and, therefore, can be readily separated and recovered from the wax or petrolatum either by warming or by steam distillation. Its use involves no complications and greatly simplifies the dewaxing operation since that portion which is not used in crystalline form serves as a useful constituent of the solvent liquid mixture.

This type of filter-aid material, therefore, possesses an advantage over the usual solid filter-aid material, such as diatomaceous earth, due to the readiness and completeness with which it can be removed from the wax or petrolatum.

As an example in carrying out the dewaxing operation according to my invention, a wax-bearing distillate obtained from mid-continent crude having a viscosity of around 60 Saybolt universal seconds at 210° F. is mixed in the proportion of about 30 parts of oil with 70 parts of a solvent liquid mixture composed of about 35% acetone, 52% benzol, and 13% toluol. Benzol is precipitated in crystalline form from this mixture at about −20° F.

The mixture of oil and solvent liquid is then chilled to about −40° F. to precipitate the solid hydrocarbons, during which chilling a substantial proportion of the benzol is crystallized, the benzol crystals being uniformly admixed or dispersed throughout the precipitated wax.

The temperature at which benzol commences to precipitate in crystalline form from the mixture depends on the relative proportion of the various components. Consequently, the relative proportions of each of the components may be regulated so as to effect substantially simultaneous precipitation of the wax and benzol crystals, in which case the benzol crystals may serve as media upon which the finely crystalline wax may adhere, and thus facilitate its separation. On the other hand, the precipitation of the benzol crystals may be delayed until the greater portion, or substantially all, of the wax constituents are precipitated. Thus, the proportions may be such that precipitation of the benzol occurs at a temperature below that at which the wax constituents are precipitated from the mixture. In this latter case, the resulting precipitate will comprise a uniform admixture of the wax and the benzol as individual or discrete crystals or particles of the two substances, and which admixture is of a free-filtering nature.

The chilled mixture is then subjected to filtration to separate the precipitated solid matter which, due to the presence of the crystalline filter-aid material, filters at a much greater rate than is possible without the presence of such crystals. The resulting filtrate, after removal of the solvent, has a pour test of around −40° F.

The filter cake may be subjected to the usual washing with fresh solvent, after which the crystallized benzol may be separated from the wax, either by washing with warm solvent, contacting with steam, or subjecting to distillation.

The invention is not necessarily restricted to the particular proportions described in the foregoing example. The proportion of ketone or other diluent or solvent liquid to benzol used depends upon the dewaxing temperature as well as upon the quantity of crystalline filter-aid material desired. Nor is the invention limited to the use of benzol as the crystalline filter-aid forming material since other liquid materials or compounds may be used which are substantially similar in melting point and boiling point. It is also contemplated that the benzol may be used in conjunction with various solvents, diluents, or wax-precipitating liquid media and may, therefore, for example, be employed with naphtha, kerosene, or other petroleum fractions, including light fractions such as propane, propylene and butane, etc.

While, in the foregoing example, separation of the wax precipitate from the chilled mixture by filtration has been described, it is contemplated that other modes of separation may also be advantageously employed, such as cold settling and centrifuging, for example.

Obviously many modifications and variations of the invention, as hereinbefore set forth, may be made without departing from the spirit and scope thereof, and therefore only such limitations should be imposed as are indicated in the appended claims.

I claim:

1. The process of dewaxing hydrocarbon oil to produce oil of 0° F. or below pour test comprising mixing with the oil a benzol-containing solvent liquid such that upon cooling to temperatures of 0° to −40° F. the benzol is precipitated in crystalline form in sufficient amount to provide a solid filter-aid material to facilitate separation of the wax from the mixture, chilling the mixture to temperatures of 0° to −40° F. thereby precipitating wax constituents and benzol, and thereafter filtering the precipitated matter from the cold solution at a temperature which will enable the production of oil of the desired low cold test.

2. The process of dewaxing hydrocarbon oil to produce low pour test oil comprising adding to the oil acetone, toluol and benzol in such proportion to each other and to the oil that upon cooling to 0° F. or below benzol is precipitated in crystalline form along with the wax constituents of the oil, cooling the mixture to a temperature of 0° to −40° F. and below the temperature necessary for precipitation of the major proportion of the wax to effect precipitation of the wax constituents in admixture with crystals of benzol thereby forming a readily filterable precipitate, and filtering the mixture to separate the resulting precipitate from the liquid hydrocarbons.

3. The process of dewaxing hydrocarbon oil to produce low pour test oil comprising mixing with the oil a benzol-containing solvent liquid adapted to precipitate benzol in crystalline form upon cooling to a temperature below that at which the substantial bulk of the wax constituents are precipitated from the mixture, cooling the mirture to effect precipitation of the wax constituents then further cooling the mixture to effect precipitation of benzol thereby forming a uniform admixture of solid wax and filter-aid material in a free-filtering condition, and filtering the mixture to separate the precipitated mass from the liquid hydrocarbons.

4. The process of dewaxing hydrocarbon oil to produce low pour test oil comprising mixing with the oil a substantial proportion of solvent liquid consisting of acetone and benzol, in which the benzol is in sufficient excess, so that upon cooling to a temperature below that at which a substantial proportion of wax has been precipitated, the excess of the benzol beyond that required to form a suitable dewaxing mixture is precipitated in crystalline form in sufficient amount to provide a solid filter-aid material to facilitate separation of the wax from the mixture, chilling the mixture to temperatures of 0° to 40° F. to precipitate the wax constituents and benzol, and thereafter filtering the precipitated matter from the solution.

5. The process of dewaxing hydrocarbon oil to produce low pour test oil comprising adding to the oil acetone, toluol and benzol in such proportion to each other and to the oil that upon cooling to a temperature below that at which the wax is precipitated from the mixture, benzol is precipitated in crystalline form, cooling the mixture to effect precipitation of the wax constituents, then further cooling the mixture to effect precipitation of benzol thereby forming a uniform admixture of solid wax and filter-aid material in a free-filtering condition, and filtering the mixture to separate the precipitated mass from the liquid hydrocarbons.

MERRILL KISER.

CERTIFICATE OF CORRECTION.

Patent No. 2,020,066. November 5, 1935.

MERRILL KISER.

It is hereby certified that error appears in the printed specification of the above numbered patent requiring correction as follows: Page 2, second column, line 71, claim 4, for "40°F." read -40°F.; and that the said Letters Patent should be read with this correction therein that the same may conform to the record of the case in the Patent Office.

Signed and sealed this 21st day of January, A. D. 1936.

Leslie Frazer

Seal) Acting Commissioner of Patents.